3,778,410
PROCESS FOR PREPARING A FINAL COPOLY-
ESTER BY REACTING A STARTING POLY-
ESTER WITH AN ACYLOXY AROMATIC CAR-
BOXYLIC ACID
Herbert F. Kuhfuss and Winston J. Jackson, Jr., Kings-
port, Tenn., assignors to Eastman Kodak Company,
Rochester, N.Y.
No Drawing. Filed Sept. 28, 1972, Ser. No. 293,292
Int. Cl. C08g 17/02, 17/14
U.S. Cl. 260—47 C
8 Claims

ABSTRACT OF THE DISCLOSURE

The process of this invention for preparing a final copolyester having an inherent viscosity of at least 0.4 is comprised of two steps. The first step of the process comprises preparing a fragmented polyester by contacting an acyloxy aromatic carboxylic acid with a starting polyester which has an inherent viscosity of at least 0.2 and is formed from a dicarboxylic acid and a diol. The second step comprises increasing the inherent viscosity of the fragmented polyester to at least 0.4 to form the final copolyester. When the starting polyester and acyloxy aromatic carboxylic acid are contacted, acidolysis occurs and there is formed a fragmented polyester composed of low molecular weight polyester molecules. The inherent viscosity of the fragmented polyester is then increased to form the final copolyester comprised of divalent radicals from the dicarboxylic acid portion of the starting polyester, divalent radicals from the diol portion of the starting polyester and divalent radicals remaining after removal of the acyl and hydroxy groups from the acyloxy aromatic carboxylic acid.

---

This invention relates to a process for preparing a final copolyester by first preparing a fragmented polyester by acidolysis of a starting polyester with an acyloxy aromatic carboxylic acid and subsequently preparing the final copolyester by increasing the inherent viscosity of the fragmented polyester.

During the last several decades useful articles prepared from synthetic polymers have gained wide acceptance. Synthetic polymers have been found to be particularly useful for preparing films, molded objects and fibers. Specifically, polyesters have enjoyed wide acceptance in the preparation of molded objects and fibers.

Numerous processes to prepare polyesters useful in the preparation of molded objects and fibers are known in the art. For instance, according to one process a diol and a dicarboxylic acid can be directly esterified to form a polyester. In another process the dicarboxylic acid is esterified with an alcohol to form the corresponding diester and the diester is then ester interchanged with a diol to form the corresponding bis-hydroxy terminated carboxylate; the bis-hydroxy terminated carboxylate is then polycondensed under high temperature and low pressure to form a high molecular weight polyester. Other processes to prepare high molecular weight polyesters are known in the art.

We have now discovered still another process for preparing high molecular weight polyesters. Broadly, according to this process a final copolyester having an inherent viscosity of at least 0.4 is prepared by first preparing a fragmented polyester by acidolysis of a starting polyester having an inherent viscosity of at least about 0.2 with an acyloxy aromatic carboxylic acid and then preparing the final copolyester by increasing the inherent viscosity of the fragmented polyester to at least 0.4.

The prior art that applicant is aware of is U.S. 3,316,-326; U.S. 3,418,276; Canadian 888,788; Canadian 893,-194; Canadian 822,194; U.S. 2,728,742; U.S. 2,981,705; U.S. 2,981,706; U.S. 3,054,779; U.S. 2,471,023; Japanese 27,485/69 and Japanese 7021811.

The process of this invention is thought to be unobvious over the prior art because it would be unobvious that a final polyester having an inherent viscosity of at least 0.4 could be prepared by contacting a starting polyester having an inherent viscosity of at least about 0.2 with an acyloxy aromatic carboxylic acid. In the first place, one would assume that contacting an acyloxy aromatic carboxylic acid with a starting polyester would result in fragmentation of the chain of the starting polyester and formation of decomposition products that would terminate the chain fragments and prevent build-up of the chain fragments into a high polymer. In the second place, even if the fragmented terminated chain would build up to a high polymer, one would except that the acyloxy aromatic carboxylic acid would react predominantly with itself and, as with many acyloxy aromatic carboxylic acids, form repeating units that would produce polymers with commercially unacceptably high melting points. The polyester of p-acyloxybenzoic acid has a melting point above 500° C., for instance.

In broad summary, the process of this invention for preparing a final copolyester having an inherent viscosity of at least 0.4 is comprised of two steps.

The first step of the process of this invention comprises preparing a fragmented polyester by contacting an acyloxy aromatic carboxylic acid and a starting polyester having an inherent viscosity of at least about 0.2. The starting polyester is formed from a dicarboxylic acid and a diol. Upon contact, the starting polyester and acyloxy aromatic carboxylic acid react by acidolysis to form a fragmented polyester. The fragmented polyester is composed of low molecular weight polyester molecules.

The second step of the process of this invention comprises preparing a final copolyester having an inherent viscosity of at least 0.4 by increasing the inherent viscosity of the fragmented polyester. The final copolyester is comprised of three kinds of divalent radicals. The first radicals come from the dicarboxylic acid portion of the polyester and are the divalent radicals remaining after removal of the hydroxyl groups from the dicarboxylic acid. The second radicals come from the diol portion of the polyester and are the divalent radicals remaining after removal of the hydrogen atoms from the diol. The third radicals come from the acyloxy aromatic carboxylic acid and are the divalent radicals remaining after removal of the acyl and hydroxy groups from the acyloxy aromatic carboxylic acid.

As an example of the process of this invention consider the final copolyester formed when the starting polyester is poly(ethylene terephthalate) and the acyloxy aromatic carboxylic acid is p-acetoxybenzoic acid. Thus, the starting polyester contains the

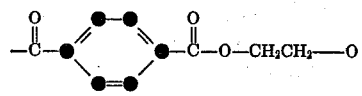

repeating unit. Upon contact, acidolysis of the poly(ethylene terephthalate) occurs to form the fragmented polyester. The molecular weight of the fragmented polyester is then increased to form the final copolyester comprised of the following divalent radicals

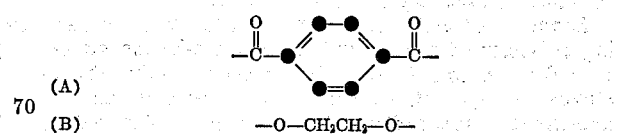

(A)

(B)        —O—CH₂CH₂—O—

(C) 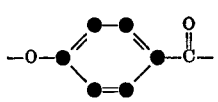

Radical (A) is contributed by the terephthalic acid portion of the polyester and radical (B) is contributed by the ethylene glycol portion of the polyester. Radical (C) is contributed by the p-acetoxybenzoic acid and is the divalent radical remaining after removal of the acetyl and hydroxy groups from the p-acetoxybenzoic acid.

Polyesters of other aliphatic glycols are generally more resistant to acidolysis than polyesters of ethylene glycol; consequently, less reduction in molecular weight occurs during the acidolysis step.

In this invention, the starting polyester is comprised of repeating units corresponding to the formula

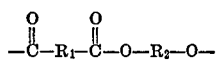

where $R_1$ is a divalent alicyclic radical having 4 to 20 carbon atoms, a divalent aliphatic radical having 1 to 40 carbon atoms or a divalent aromatic radical having 6 to 16 carbon atoms with the carbonyl linkages separated by at least 3 carbon atoms, and $R_2$ is a divalent aliphatic radical of 2 to 40 carbon atoms, a divalent alicyclic radical of 4 to 20 carbon atoms, a divalent aromatic radical of 6 to 20 carbon atoms or a divalent poly(alkylene oxide) radical having a molecular weight in the range of 200 to 8000.

In a preferred embodiment $R_1$ is a divalent aromatic radical having 6 to 16 carbon atoms.

In a still more preferred embodiment $R_1$ is a divalent aromatic radical having 6 carbon atoms.

In a preferred embodiment $R_2$ is a divalent aliphatic radical having 2 carbon atoms or a divalent aromatic radical having 6 to 20 carbon atoms.

In the most preferred embodiment the starting polyester is poly(ethylene terephthalate).

Examples of dicarboxylic acids that can be used to form the starting polyester include malonic; dimethylmalonic; succinic; glutaric; adipic; 2-methyladipic; trimethyladipic; pimelic; 2,2-dimethylglutaric; 3,3-diethylsuccinic; azelaic; sebacic; suberic; 1,3-cyclopentanedicarboxylic; 1,3-cyclohexanedicarboxylic, 1,4-cyclohexanedicarboxylic; terephthalic; isophthalic; 4-methylisophthalic; t-butylisophthalic; 2,5-norbornanedicarboxylic; 1,4-naphthalic; diphenic; 4,4' - oxydibenzoic; 4,4' - methylenedibenzoic; diglycolic; thiodipropionic; 4,4'-sulfonyldibenzoic; 2,5-naphthalenedicarboxylic; 2,6-naphthalenedicarboxylic; bibenzoic acid; bis(p-carboxyphenyl) methane; p-oxy(p-carboxyphenyl) benzoic acid; ethylene-bis(p-oxybenzoic acid); ethylene-bis-p-benzoic acid; tetramethylene-bis(p-oxybenzoic acid); and 1,5-naphthalene dicarboxylic acids. The ester-forming derivatives which may be used include the esters, such as the methyl, ethyl, phenyl, and monomeric ethylene glycol esters. Examples of these esters include dimethyl 1,4 - cyclohexanedicarboxylate; dimethyl 2,6 - naphthalenedicarboxylate; dimethyl 4,4'-sulfonyldibenzoate; dimethyl isophthalate; dimethyl terephthalate; and diphenyl terephthalate. Copolyesters may be prepared using two or more of the above dicarboxylic acids or esters thereof. Other derivatives may also be used to prepare these polyesters.

Examples of diols that can be used to form the starting polyester of this invention include ethylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 1,3-butanediol, 1,4-butanediol; 1,5 - pentanediol; 1,6 - hexanediol; 2,2,4 - trimethyl-1,6 - hexanediol; 1,4 - cyclohexanediol; 1,4 - cyclohexanedimethanol; p - xylylene diol; 4,4' - thiodiphenol; 4,4'-methylenediphenol; 4,4' - dihydroxybiphenyl; hydroquinone; resorcinol; 4,4'-sulfonyldiphenol; 4,4'-oxydiphenol; 4,4' - isopropylidenediphenol (also called bisphenol A); 4,4'-isopropylidenebis(2,6 - dichlorophenol); 4,4'-cyclohexylidenediphenol; 4,4' - (2-norbornylidene)-diphenol; 4,4'-(hexahydro-4,7 - methanoindan-5-ylidene)diphenol; 2,5-naphthalenediol; and 2,5 - norbornanediol. Copolyesters may be prepared using two or more of the above diols. Other dihydric phenols listed in U.S. Pats. 3,030,-335 and 3,317,466 may be used. Two or more dicarboxylic acids or diols may be used to give copolyesters or block polymers.

Examples of other diols include poly(alkylene oxide) glycols of the type well known in the art and disclosed in U.S. 3,023,192. These poly(alkylene oxide) glycols correspond to the formula $$HO(RO)_nH$$ 

in which R is a divalent alkyl radical containing 2 to 4 carbon atoms and $n$ is an integer of a value to provide a divalent poly(alkylene oxide) radical having a molecular weight of between about 200 and about 8000.

Representative poly(alkylene oxide) glycols include poly(ethylene oxide) glycol, poly(propylene oxide) glycol, and poly(tetramethylene oxide) glycol. Mixtures of poly(alkylene oxide) glycols can be used.

The poly(alkylene oxide) glycol may have a single molecular weight or it may be a mixture of a low and high molecular weight poly(alkylene oxide) glycol or it may be a mixture of several poly(alkylene oxide) glycols of graduating molecular weight. Broadly, the amount of divalent poly(alkylene oxide) radical can be in the range of 5 to 90 weight percent, based on the total weight of divalent radical formed from the diols.

One preferred poly(alkylene oxide) glycol is poly-(tetramethylene oxide) glycol because copolyesters prepared with this glycol exhibit desirable elastomeric properties.

Another poly(alkylene oxide) glycol that can be used is "Pluronic L-35" which is a product of the Wyandotte Chemical Company and is a hydroxy terminated block copolymer of about 1900 molecular weight of, based on the total weight of the block copolymer, about 25 weight percent of a first block of poly(oxyethylene) alcohol, about 50 weight percent of a second block of poly(oxypropylene) and about 25 weight percent of a third block of poly(oxyethylene) alcohol.

Although broadly the poly(alkylene oxide) glycol can have a molecular weight in the range of 200 to 8000, in a preferred embodiment the molecular weight is in the range of 1000 to 4000.

The starting polyesters of this invention can be prepared by a conventional process well known in the art, such as ester interchange followed by polycondensation.

Broadly, in this invention the starting polyester is contacted with an acyloxy aromatic carboxylic acid having at least 3 carbon atoms between the carboxyl group and the acyloxy group. The acyloxy aromatic carboxylic acid corresponds to formula (1) 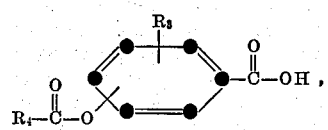

(2) 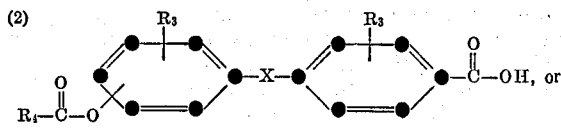

(3) 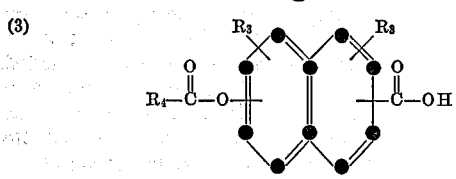

where $R_3$ in (1), (2) and (3) is hydrogen, chlorine or an alkyl or alkoxy group containing 1 to 4 carbon atoms, X in (2) is a direct bond, $-CH_2-$, $-(CH_2)_2-$, $-CH(CH_3)-$, $-CH(C_2H_5)-$, $-C(CH_3)_2-$, $-O-$, $-S-$, or $-SO_2-$, $R_4$ in (1), (2) and (3) is a monovalent alkyl radical of 1 to 8 carbon atoms or an monovalent aromatic radical of 6 carbon atoms, and the carboxyl and acyloxy groups in (3) can be bonded to the same or different rings.

In a preferred embodiment the acyloxy aromatic carboxylic acid corresponds to the structure

or

In a more preferred embodiment $R_4$ in the above structures is a monovalent alkyl radical having 1 to 8 carbon atoms.

In a still more preferred embodiment $R_4$ is a monovalent alkyl radical having 1 to 4 carbon atoms.

In the most preferred embodiment the acyloxy aromatic carboxylic acid is p-acetoxybenzoic acid.

Examples of acyloxy aromatic carboxylic acids include m-acetoxybenzoic acid; p-acetoxybenzoic acid; 4-acetoxy-3-methoxybenzoic acid; 4-acetoxy-3-chlorobenzoic acid; 4-acetoxy-3,5-dichlorobenzoic acid; p-(p-acetoxyphenyl)benzoic acid and p - (p - acetoxyphenylsulfonyl)benzoic acid.

The acyloxy aromatic carboxylic acids can be prepared by conventional processes such as reaction between a hydroxy aromatic acid, such as p-hydroxybenzoic acid, and a carboxylic anhydride, such as acetic anhydride. Other processes for preparation of the acyloxy aromatic carboxylic acids are well known in the art.

In this invention the amount of acyloxy aromatic carboxylic acid can vary from 5 to 95 mole percent depending on the desires of the practitioner of the invention. In this invention the range of acyloxy aromatic carboxylic acid is based on the total moles of the dicarboxylic acid of the starting polyester and acyloxy aromatic carboxylic acid combined. A more preferred range of acyloxy aromatic carboxylic acid is 15 to 90 mole percent. The most preferred range of acyloxy aromatic carboxylic acid is 20 to 80 mole percent.

As noted above, the first step of this invention involves preparing the fragmented polyester by contacting the starting polyester with the acyloxy aromatic carboxylic acid.

The thermodynamic conditions that can be used to contact the starting polyester with the acyloxy aromatic carboxylic acid can vary widely depending on the desires of the practitioner of the invention. Although other temperatures can be used, the starting polyester and the acyloxy aromatic carboxylic acid can be contacted within a temperature range of about 240° to about 300° C. In another embodiment the starting polyester and acyloxy aromatic carboxylic acid can be contacted within the temperature range of 250° C. to 300° C. Temperatures up to 350° C. may be used with stable polyesters of aromatic diols and aromatic dicarboxylic acids. Temperatures higher than about 350° C. can be undesirable since temperatures this high may cause degradation of the polyester. Temperatures below about 240° C. can be undesirable since the reaction rate between the acyloxy aromatic carboxylic acid and the starting polyester will be lowered. A wide variety of pressures can be used to prepare the fragmented polyester. Atmospheric pressure is typically used during the first step of this invention. A wide variety of times can be used to prepare the fragmented polyester. Of course, the starting polyester and the acyloxy aromatic carboxylic acid must be in contact for a long enough period of time for acidolysis to occur.

The acyloxy aromatic carboxylic acid can be contacted with the starting polyester using a wide variety of methods well known in the art. In most instances, the starting polyester and acyloxy aromatic carboxylic acid are solids at standard temperature and pressure. In this instance the two solids can be mixed and heated until molten. In other instances the starting polyester and acyloxy carboxylic acid can be in liquid form, in which case the two liquids can be contacted by admixing the liquids.

As noted above, the second step of this invention involves increasing the inherent viscosity of the fragmented polyester to at least 0.4 to form the final copolyester of the invention which is suitable for forming into useful articles. The increase in inherent viscosity of the fragmented polyester can be accomplished by any one of several conventional methods well known in the art to build up the molecular weight of linear polyesters. When the fragmented polyester is a hot, molten material, the fragmented polyester can be conveniently built up by a technique similar to the polycondensation step in the production of poly(ethylene terephthalate). In this technique a sub-atmospheric pressure is created above the fragmented polyester and the fragmented polyester is heated while polycondensation products are removed overhead. The fragmented polyester can be stirred if desired.

When the fragmented polyester takes the form of a solid, molecular weight build up can be conveniently accomplished by solid-phase or fluidization techniques well known in the art such as are used to build up the molecular weight of poly(ethylene terephthalate). These techniques are particularly useful for copolyesters which solidify during melt polymerization.

The thermodynamic conditions that can be used to prepare the final copolyester by increasing the inherent viscosity of the fragmented polyester can also vary widely depending on the desires of the practitioner of the invention. Although other temperatures can be used, in one embodiment a temperature in the range of about 200° to about 350° C. can be used, and in another embodiment a temperature in the range of 200° to 300° C. can be used. As in the case of the preparation of some fragmented polyesters, temperatures above 350° C. can be used but tend to cause degradation of the fragmented polymer. Temperatures below 200° C. produce less desirable rates of increase in the inherent viscosity of the fragmented polyester. Although other pressures can be used, a pressure in the range of about 800 mm. to 0.05 mm. Hg can be conveniently used. It is particularly convenient to conduct the first step of the invention at approximately atmospheric pressure and then start the second step of the invention at the same pressure and gradually reduce the pressure as the inherent viscosity of the fragmented polyester builds up. The time that can be used is not critical but, of course, sufficient time must be allowed to build up the fragmented polyester to the inherent viscosity desired for the final copolyester.

The inherent viscosity of the final copolyester of this invention is at least 0.4, but can vary widely upward from 0.4. In one embodiment the inherent viscosity of the final copolyester is at least 0.5. The inherent viscosity of the final copolyester can, if desired, be increased still further to an inherent viscosity of 0.6, 0.7, 1.0, or even higher, using techniques well known in the art for increasing the molecular weight of linear polyesters.

The inherent viscosity of the polyesters of this invention are measured at 25° C. using 0.50 gram of polymer per 100 ml. of a solvent composed of 60 volumes of phenol and 40 volumes of tetrachloroethane.

Although the first and second steps of this invention can be conducted without use of a catalyst other than the catalyst in the polyester itself, a catalyst such as cobalt may be used in the second step to facilitate inherent viscosity build-up of the fragmented polyester.

In one particular advantageous embodiment, the final copolyester formed from the process of this invention exhibits particularly advantageous mechanical properties. This final copolyester contains no substantial amount of aliphatic to aromatic oxygen linkages and is prepared from selected dicarboxylic acids, ethylene glycol and a quantity of an acyloxy benzoic acid which is within a specific range.

In a typical example of the practice of this invention granular poly(ethylene terephthalate) having an inherent viscosity of about 0.6 and 60 mole percent p-acetoxybenzoic acid are placed in a stirred reaction vessel and heated to about 275° C. for about one hour or until most of the acetic acid has distilled from the vessel and a very low melt viscosity fragmented polyester has been obtained. A vacuum is then applied and stirring continued until the inherent viscosity of the fragmented polyester is built up to form the final copolyester having a high melt viscosity and an inherent viscosity of about 0.6.

The final copolyesters of this invention are useful for preparing molded objects. As noted earlier, molded objects of some specific copolyesters wherein the range of radical (C) is within 20 to 70 mole percent exhibit mechanical properties which are unobvious over the prior art.

The final copolyesters of this invention are also useful for preparing films. Extruded, quenched films of the copolyesters exhibit desirable mechanical properties and are often transparent. For example, tough, flexible films can be pressed at 400° C. from a copolyester prepared from poly(ethylene terephthalate) and 90 mole percent p-acetoxybenzoic acid. Some of the final copolyesters prepared by the process of this invention are particularly suitable for preparation of biaxially oriented, heatset motion picture films due to the desirable mechanical properties of the films and a solvent splicable character. Films which are oriented monoaxially can be fibrillated to produce strong twine.

The final copolyesters of the invention are also useful in preparing fibers, foamed plastic products, coatings and adhesives.

The final copolyesters of this invention are used to prepare useful articles using conventional methods and conventional apparatus. For instance the final copolyesters can be formed into fibers by conventional melt spinning techniques and subsequently drafted, heatset and further processed according to techniques well known in the art. The final copolyesters can be injection molded using conventional equipment and techniques.

The final copolyesters of this invention also may contain nucleating agents, fillers, pigments, glass fibers, asbestos fibers, antioxidants, stabilizers, plasticizers, lubricants, and other additives. Some final copolyesters also may be used as reinforcing agents to increase the strength and stiffness of other plastics. For example, the tensile strength and flexural modulus of poly(tetramethylene terephthalate) are substantially increased by up to 50 weight percent or more of the final copolyester of poly(ethylene terephthalate) and 60 mole percent p-acetoxybenzoic acid.

In the following examples the starting polyesters are prepared by the conventional techniques of ester interchange and polycondensation of the glycols and methyl esters of the dicarboxylic acid. A conventional zinc acetate/antimony acetate catalyst is used to prepare the ethylene glycol polyesters, and zinc acetate or titanium isopropoxide are used to prepare the other polyesters.

The final copolyesters are dried in an oven at 100° C. overnight prior to injection molding to give bars for testing. ASTM procedures are used for measuring the mechanical properties of the final copolyesters. The specific procedures are: tensile strength and elongation, ASTM D–1708; flexural modulus, ASTM D–790; Izod impact strength, ASTM D–256 Method A.

The following examples are presented to illustrate the practice of the process of the invention and to illustrate the utility of the process of the invention.

EXAMPLE 1

This example illustrates the preparation of a final copolyester from poly(ethylene terephthalate) and 60 mole percent of p-acetoxybenzoic acid.

A mixture of 69.1 g. (0.36 mole) of poly(ethylene terephthalate) (I.V. 0.60) and 97.2 g. (0.54 mole) p-acetoxybenzoic acid is placed in a 500-ml. flask equipped with a stirrer, a short distillation column and an inlet for nitrogen. The flask is evacuated and purged three times with nitrogen before being lowered into a Woods-metal bath maintained at 275° C. As the mixture is stirred at 275° C. in a nitrogen atmosphere, acetic acid slowly distills from the flask. After 60 min., most of the acid has evolved and a low melt viscosity fragmented polyester is obtained. A vacuum of 0.5 mm. is then applied at 275° C., and stirring is continued for 4 hr. to build up the inherent viscosity. A white, opaque, high melt viscosity final copolyester polymer is obtained. The final copolyester has an inherent viscosity of 0.62.

Fibers melt spun at 260° C. have the following properties as spun (undrafted): tenacity 3.3 g./den., elongation 5%, elastic modulus 196 g./den. Another similarly prepared copolyester, inherent viscosity 0.66, is injection molded at 260° C. with a 1-oz. Watson-Stillman injection molding machine to give 2½ x ⅜ x 1/16-in. tensile bars and 5 x ½ x ⅛-inch flexure bars. The following table lists the properties of these bars.

Tensile strength, $10^3$ p.s.i. _____ 34.3
Flexural modulus, $10^5$ p.s.i. _____ 17.8
Notched Izod impact strength, ft.-lb./in. of notch __ 4.4
Oxygen index, percent _____ 32

The experiment is repeated using final copolyesters containing 30, 40, 50, 55, 65, 70 and 80 mole percent p-acetoxybenzoic acid. The tensile strength, flexural modulus and notched Izod impact strength of these final copolyesters are not as high as with 60 mole percent, but these properties are generally higher than the properties of conventional polyesters and are quite suitable for typical applications such as molding, extruding into fibers and the like.

Although the mechanical properties are generally appreciably lower than those in the above table, the final copolyester is suitable for molding applications when the terephthalic acid is replaced in whole or in part by the alicyclic or aliphatic dicarboxylic acid disclosed to be useful in this invention. The final copolyester is also suitable for molding applications when aromatic, aliphatic or poly(alkylene oxide) glycols disclosed to be useful in this invention are used in place of the ethylene glycol. Other acyloxy aromatic carboxylic acids within the scope of this invention give desirable results.

Unlike most polyesters, the mechanical properties of the final copolyesters of this invention can in some instances be appreciably affected by small variations in molding conditions and physical dimensions of the bars used for testing. For example, when the above final copolyester containing 60 mole percent p-hydroxybenzoic acid is molded in a 6-oz. New Britain 175 reciprocating screw injection-molding machine at 260° C. into molds cooled with water at 15° C., the following properties are obtained with 8½ x ¾ x ⅛-inch tensile bars: tensile strength of 26,500 p.s.i., flexural modulus of $19.3 \times 10^5$ p.s.i., and notched Izod impact strength 13.6 ft. lb./in. of notch. Although applicants are uncertain as to why the larger 8½ x ¾ x ⅛-inch bars give different tensile strengths than the 1/16-in. bars used to obtain values for the above table, one theory of particular merit is that the degree of orientation affects the level of properties. Thus, pursuing this theory, thin bars generally would exhibit higher tensile strengths than thick bars.

EXAMPLE 2

This example illustrates the preparation of a final copolyester from poly(ethylene terephthalate) and 30 mole percent of p-propionyloxybenzoic acid.

A mixture of 120.9 g. (0.63 mole) of poly(ethylene terephthalate) (I.V. 0.60), 52.4 g. (0.27 mole) p-propionyloxybenzoic acid, and 0.045 g. cobalt carbonate is placed in a 500-ml. flask equipped with a stirrer, a short distillation column, and an inlet for nitrogen. The flask is evacuated and purged three times with nitrogen before being lowered into a Woods-metal bath maintained at 275° C. As the mixture is stirred at 275° C. in a nitrogen atmosphere, propionic acid slowly distills from the flask. After 60 min., most of the acid has evolved and a low melt viscosity fragmented polyester is obtained. A vacuum of 0.5 mm. is then applied at 275° C., and stirring is continued for 4 hrs. A white, opaque, medium melt viscosity copolyester of 0.26 inherent viscosity is obtained. The copolyester is ground to pass a 20-mesh screen for subsequent additional solid phase build-up to form the final copolyester.

Solid phase build-up is accomplished by heating the particles under a reduced pressure of 0.05–0.1 mm. Hg at 210° C. for 8 hrs. The final copolyester has an inherent viscosity of 0.51 and a crystalline melting point of 227° C.

Fibers are melt spun, drafted and heatset by conventional techniques. The fibers have the following properties: tenacity 3.1 g./den., elongation 11%, elastic modulus 55 g./den., and flow point 190° C.

Pressed films of this final copolyester are clear, tough, flexible, and soluble in methylene chloride. Strips of film are drafted 300% in steam, clamped to a frame to prevent shrinkage, and then crystallized by heating in an oven at 145° C. for 5 min. The strips are easily spliced together with methylene chloride.

Although the mechanical properties may vary, the final copolyester is suitable for film forming and molding applications when alicyclic or aliphatic dicarboxylic acids within the scope of this invention are used in place of the terephthalc acid. Other aromatic dicarboxylic within the scope of the invention can be used. Also, other aromatic glycols, aliphatic glycols or poly(alkylene oxide) glycols are used in place of the ethylene glycol. Other acyloxy aromatic carboxylic acids useful in this invention give desirable results. A similar final copolyester with only 5 mole percent-p-propionyloxybenzoic acid produces clear films having desirable mechanical properties but not soluble in methylene chloride.

EXAMPLE 3

Example 1 is repeated with poly(ethylene terephthalate) having an inherent viscosity of 0.15 instead of 0.60. A copolyester having an inherent viscosity of 0.64 and similar properties is obtained.

EXAMPLE 4

A copolymer is prepared with 0.18 mole (90 mole percent of p-propionyloxybenzoic acid and 0.02 mole of poly(ethylene terephthalate) by the procedure of Example 2. The fragmented polyester, which solidifies in the flask during the polymerization, is ground to pass a 20-mesh screen and built up by the solid-phase procedure at 280° C. A tough, flexible, white, opaque film is obtained when pressed at 400° C. Because of insolubility in the phenol-tetrachloroethane solvent used for determining inherent viscosities, the inherent viscosity cannot be determined.

EXAMPLE 5

This example illustrates the preparation of a final copolyester from a mixture of aromatic dicarboxylic acids.

A final copolyester is prepared with 0.6 mole of p-acetoxybenzoic acid and 0.4 mole of copoly(80/20 ethylene terephthalate/ethylene isophthalate (I.V. 0.76) by the procedure described in Example 1. The final copolyester has an inherent viscosity at 0.60. A film pressed at 300° C. is quite tough. Molded bars exhibit desirable mechanical properties.

Other mixtures of suitable aromatic dicarboxylic acids can be used. Similar results are achieved when mixtures of suitable aliphatic acids are used. Similar results are also achieved when mixtures of alicyclic acids are used. Mixtures of aromatic, alicyclic and aliphatic dicarboxylic acids can also be used.

EXAMPLE 6

This example illustrates the preparation of a final copolyester from a mixture of aromatic and aliphatic dicarboxylic acids.

Example 1 is repeated, except the starting polyester that is contacted with the p-acetoxybenzoic acid is formed from ethylene glycol, 60 mole percent 4,4'-sulfonyldibenzoic acid, and 40 mole percent 1,12-dodecanedicarboxylic acid. The final copolyester has an inherent viscosity of 0.53. A pressed film is tough and hazy. Molded bars exhibit desirable mechanical properties.

EXAMPLE 7

This example illustrates the preparation of a final copolyester using a branched chain aliphatic glycol.

Using the procedure of Example 1 a final copolyester is prepared with 0.07 mole of poly(2,2-dimethyltrimethylene terephthalate) and 0.03 mole of p-acetoxybenzoic acid. The final copolyester has an inherent viscosity of 0.39. A film pressed at 300° C. is white, opaque, and tough.

EXAMPLE 8

This example illustrates the preparation of a final copolyester using a mixture of an alicyclic glycol and an aliphatic glycol.

The procedure of Example 1 is used to prepare a final copolyester of 0.06 mole percent of p-acetoxybenzoic and 0.04 mole percent of copoly(80/20 1,4-cyclohexylenedimethylene terephthalate/ethylene terephthalate). The final copolyester has an inherent viscosity of 0.38.

Other mixtures of glycols within the scope of the invention can be used.

EXAMPLE 9

This example illustrates the preparation of a final copolyester using the meta isomer of an acyloxy carboylic acid.

The procedure of Example 1 is used to prepare a final copolyester with 0.855 mole of poly(ethylene terephthalate) and 0.045 mole (5 mole percent) of m-acetoxybenzoic acid. A final copolyester with an inherent viscosity of 0.51 is obtained. Pressed films of the final copolyester are clear and flexible. Other isomers of other acyloxy aromatic carboxylic acids that are within the scope of the invention produce similar results.

EXAMPLE 10

The procedure of Example 1 is used to prepare a copolymer with 0.48 mole (60 mole percent) of m-acetoxybenzoic acid and 0.32 mole of poly(ethylene terephthalate). A light-amber, clear, high melt viscosity polymer is obtained with an inherent viscosity of 0.41. A film pressed at 300° C. is clear and soluble in chloroform.

EXAMPLE 11

This example illustrates the preparation of a final copolyester using a naphthalene dicarboxylic acid.

The procedure of Example 1 is used to prepare a copolymer with 0.6 mole of p-acetoxybenzoic acid and 0.4 mole of poly(2,6-ethylene naphthalate). A high molecular weight final copolyester with an inherent viscosity of 0.58 is obtained. A film pressed at 300° C. is white, opaque, and tough. Molded bars exhibit desirable mechanical properties.

Other aromatic dicarboxylic acids within the scope of this invention can be substituted for the naphthalenedicarboxylic acid with similar results obtained.

EXAMPLE 12

A final copolyester is prepared from 0.6 mole (60 mole percent) of p-acetoxybenzoic acid and 0.4 mole of poly-(ethylene terephthalate) modified with 35 wt. percent of polytetramethylene glycol (M.W. 1000) by the procedure described in Example 1, except the reaction is carried out at 265° C. The copolyester has an inherent viscosity of 0.87 and is suitable for injection molding. Similar results are achieved when other poly(alkylene oxide)glycols are used. Similar results are also achieved when polytetramethylene glycols of other molecular weights are used.

EXAMPLE 13

This example illustrates the excellent film properties which can be obtained from the final copolyester of this invention. The procedure of Example 2 is used to prepare a final copolyester from 75 mole percent poly(ethylene terephthalate) and 25 mole percent of p-acetoxybenzoic acid. The final copolyester has an inherent viscosity of 0.55. A 20-mil film is pressed. This is biaxially stretched 300% at 140° C. with a Long Machine. After the film is clamped to a frame to prevent shrinkage and heatset for 1 min. at 210° C., it has a yield strength of 14,500 p.s.i., break strength of 24,500 p.s.i., 66% elongation, $8.1 \times 10^5$ p.s.i. tensile modulus, and 185° C. heat-distortion temperature at 50 p.s.i. load. The film can be spliced with methylene chloride.

EXAMPLE 14

A final copolyester is made with 0.08 mole (40 mole percent) of p-acetoxybenzoic acid and 0.12 mole of poly-(tetramethylene terephthalate) (I.V. 1.10) by the procedure described in Example 1, except the reaction is carried out at 245° C. The copolymer, which solidifies during its preparation, has an inherent viscosity of 0.44.

EXAMPLE 15

A final copolyester is made with 0.06 mole of p-acetoxybenzoic acid and 0.04 mole of poly(4,4'-isopropylidenedi-p-phenylene isophthalate) (I.V. 0.65) by the procedure described in Example 1, except the first step of the reaction is carried out at 295° C. and vacuum is applied at 350° C. for 10 min. A high melt viscosity, light amber polymer is obtained with an inherent viscosity of 0.41. A film pressed at 320° C. is flexible and tough.

Although the invention has been described in considerable detail with particular reference to certain preferred embodiments thereof, variations and modifications can be effected within the spirit and scope of the invention.

We claim:
1. A process comprising
   (1) preparing a fragmented polyester by contacting within a temperature range of about 240° to about 350° C.
   (A) a starting polyester of a dicarboxylic acid and a diol having an inherent viscosity of at least about 0.2 measured at 25° C. using 0.50 gram of polymer per 100 ml. of a solvent composed of 60 volumes of phenol and 40 volumes of tetrachloroethane, the polyester being comprised of repeating units corresponding to the formula

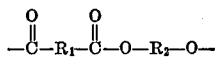

where $R_1$ is a divalent alicyclic radical having 4 to 20 carbon atoms, a divalent aliphatic radical having 1 to 40 carbon atoms, or a divalent aromatic radical having 6 to 16 carbon atoms with the carbonyl linkages separated by at least 3 carbon atoms, and $R_2$ is a divalent aliphatic radical of 2 to 40 carbon atoms, a divalent alicyclic radical of 4 to 20 carbon atoms, a divalent aromatic radical of 6 to 20 carbon atoms, or a divalent poly(alkylene oxide) radical having a molecular weight in the range of 200 to 8000, and (B) from 5 to 95 mole percent, based on the total moles of (B) and the dicarboxylic acid combined, of an acyloxy aromatic carboxylic acid having at least 3 carbon atoms between the carboxyl group and the acyloxy group, the acyloxy aromatic carboxylic acid corresponding to formula (1)

(2)

(3)

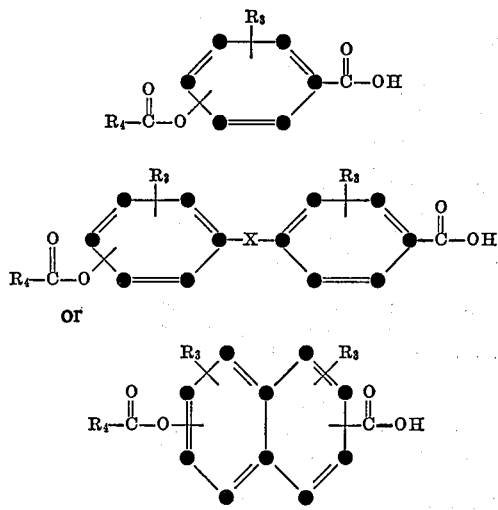

where $R_3$ in (1), (2) and (3) is hydrogen, chlorine or an alkyl or alkoxy group containing 1 to 4 carbon atoms, X in (2) is a direct bond, $—CH_2—$, $—(CH_2)_2—$, $—CH(CH_3)—$, $—CH(C_2H_5)—$, $—C(CH_3)_2—$, $—O—$, $—S—$, or $—SO_2—$, $R_4$ in (1), (2) and (3) is a monovalent alkyl radical of 1 to 8 carbon atoms or a monovalent aromatic radical of 6 carbon atoms, and the carboxyl and acyloxy groups in (3) can be bonded to the same or different rings, and (2) preparing a final copolyester having an inherent viscosity of at least 0.4 measured at 25° C. using 0.50 gram of polymer per 100 ml. of a solvent composed of 60 volumes of phenol and 40 volumes of tetrachloroethane, the preparation of the final copolyester reuslting from increasing the inherent viscosity of the fragmented polyester by exposing the fragmented polyester to a pressure in the range of about 800 mm. to about 0.05 mm. Hg and a temperature in the range of about 200° to about 350° C.

2. The process of claim 1 wherein
(B) corresponds to the structure

or

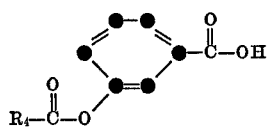

3. The process of claim 2 wherein
$R_1$ is a divalent aromatic radical having 6 to 16 carbon atoms,
$R_2$ is a divalent aliphatic radical having 2 carbon atoms, and
(B) is the range of 15 to 90 mole percent and $R_4$ is a monovalent alkyl radical having 1 to 8 carbon atoms.

4. The process of claim 2 wherein
$R_1$ is a divalent aromatic radical having 6 to 16 carbon atoms,
$R_2$ is a divalent aromatic radical having 6 to 20 carbon atoms, and
(B) is in the range of 15 to 90 mole percent and $R_4$ is a monovalent alkyl radical having 1 to 8 carbon atoms.

5. The process of claim 3 wherein
step (1) is conducted within a temperature range of 250° to 300° C., and
step (2) is conducted within a range of 200° to 300° C.

6. The process of claim 5 wherein
$R_1$ is a divalent aromatic radical having 6 carbon atoms, and
(B) corresponds to the structure

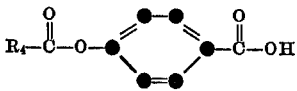

where $R_4$ is a monovalent alkyl radical having 1 to 4 carbon atoms.

7. A process comprising
(1) preparing a fragmented polyester by contacting, at a temperature within the range of 250° to 300° C.,
 (A) a starting polyester which is poly(ethylene terephthalate) having an inherent viscosity of at least 0.2 measured at 25° C. using 0.50 gram of polymer per 100 ml. of a solvent composed of 60 volumes of phenol and 40 volumes of tetrachloroethane, and
 (B) from 20 to 80 mole percent p-acetoxybenzoic acid, based on the total moles of terephthalic acid and p-acetoxybenzoic acid combined, and
(2) preparing a final copolyester having an inherent viscosity of at least 0.5 measured at 25° C. using 0.50 gram of polymer per 100 ml. of a solvent composed of 60 volumes of phenol and 40 volumes of tetrachloroethane, the preparation of the final copolyester resulting from increasing the inherent viscosity of the fragmented polyester by subjecting the fragmented prepolymer to a temperature within the range of 200° to 300° C. and a pressure within the range of 800 mm. to 0.5 mm. Hg.

8. The process of claim 1 wherein $R_2$ is a divalent aliphatic radical having 2 carbon atoms.

References Cited
UNITED STATES PATENTS

| | | | |
|---|---|---|---|
| 3,345,331 | 10/1967 | Reese | 260—47 |
| 3,515,696 | 6/1970 | Tsuji et al. | 260—47 |
| 3,549,593 | 12/1970 | Takekoshi | 260—47 |
| 3,637,595 | 1/1972 | Cottis et al. | 260—47 |

LESTER L. LEE, Primary Examiner

U.S. Cl. X.R.

117—161 K; 260—33.4 P, 33.8 R, 40 R, 40 P, 49, 78.3 R, 860; 264—288, 331